US006558760B1

(12) United States Patent
Paleari et al.

(10) Patent No.: US 6,558,760 B1
(45) Date of Patent: May 6, 2003

(54) PACKAGING FILM AND CONTAINERS MADE THEREFROM

(75) Inventors: Mario Paleari, Pogliano (IT); Romano Spigaroli, Legnano (IT)

(73) Assignee: Cryovac, Inc., Duncan, SC (US)

( * ) Notice: Subject to any disclaimer, the term of this patent is extended or adjusted under 35 U.S.C. 154(b) by 0 days.

(21) Appl. No.: 09/355,095

(22) PCT Filed: Jan. 14, 1998

(86) PCT No.: PCT/EP98/00183

§ 371 (c)(1),
(2), (4) Date: Sep. 13, 1999

(87) PCT Pub. No.: WO98/31543

PCT Pub. Date: Jul. 23, 1998

(30) Foreign Application Priority Data

Jan. 21, 1997 (EP) ............................................ 97100840

(51) Int. Cl.$^7$ .............................................. B32B 27/32
(52) U.S. Cl. ..................... 428/34.8; 428/34.9; 428/523; 428/910; 428/409; 426/113; 426/127; 426/129; 426/412; 53/477; 525/240; 526/352; 526/348.1; 526/348.2; 526/348.4; 526/348.5
(58) Field of Search ................................. 426/412, 129, 426/113, 127; 428/34.8, 34.9, 35.4, 36.7, 409, 349, 523, 516, 515, 910; 525/240; 526/942, 352, 348.1, 348.2, 348.4, 348.5; 264/469, 470, 471; 53/477

(56) References Cited

U.S. PATENT DOCUMENTS

| | | |
|---|---|---|
| 3,171,539 A | 3/1965 | Holbrook et al. |
| 3,741,253 A | 6/1973 | Brax et al. |
| 4,120,716 A | 10/1978 | Bonet |
| 4,352,702 A | 10/1982 | Bornstein |
| 4,411,919 A | 10/1983 | Thompson |
| 4,424,243 A | 1/1984 | Nishimoto et al. ............ 428/36 |
| 4,456,646 A | 6/1984 | Nishimoto et al. .......... 428/216 |
| 4,595,625 A | 6/1986 | Crass et al. .................. 428/215 |
| 4,854,999 A | 8/1989 | Schirmer |
| 4,855,183 A | 8/1989 | Oberle |
| 4,888,223 A | 12/1989 | Sugimoto et al. |
| 5,047,253 A | 9/1991 | Juhl et al. |
| 5,049,714 A | 9/1991 | Bresniewicz et al. .... 219/10.55 |
| 5,089,073 A | 2/1992 | Schirmer |
| 5,139,804 A | 8/1992 | Hoffman et al. |
| 5,145,728 A * | 9/1992 | Itaba et al. .................. 428/212 |
| 5,298,326 A | 3/1994 | Horpoth et al. |
| 5,407,611 A * | 4/1995 | Wilhoit et al. ................. 264/22 |
| 6,090,483 A * | 7/2000 | Kume et al. ................. 428/354 |
| 6,342,282 B1 * | 1/2002 | Yoshii et al. ............... 428/34.9 |

FOREIGN PATENT DOCUMENTS

| | | |
|---|---|---|
| AU | 61013/86 A1 | 10/1985 |
| EP | 0 319 732 A1 | 6/1989 |
| EP | 0 485 847 A1 | 11/1991 |
| EP | 0 594 918 A1 | 10/1992 |
| EP | 0 567 125 A2 | 4/1993 |
| GB | 2 009 033 A | 6/1979 |
| GB | 2 205 273 B | 12/1988 |
| JP | 58019334 A | 2/1983 |
| JP | 3-65338 | 3/1991 |
| WO | 90/01043 | 2/1990 |

OTHER PUBLICATIONS

Farley et al., "Heat Sealing of Semicrystalline Polymer Films" Journal of Applied Polymer Science, vol. 51, pp. 121–131 (1994) John Wiley & Sons, Inc.

* cited by examiner

*Primary Examiner*—D. Lawrence Tarazano
(74) *Attorney, Agent, or Firm*—Daniel B. Ruble

(57) ABSTRACT

The sealability of a thermoplastic, mono- or multi-layer film having an irradiated sealing layer comprising a polyethylene and/or an ethylene-x-olefin copolymer with a density $\geq 0.915$ g/cm$^3$ is improved by corona treating said sealing layer. The integrity of the obtained sealed container is maintained under pasteurizing or cook-in conditions.

19 Claims, No Drawings

PACKAGING FILM AND CONTAINERS MADE THEREFROM

The present invention relates to a mono- or multi-layer thermoplastic film with improved sealability properties and to bags, pouches, and other containers made therefrom by sealing the film to itself. The invention also relates to the use of such film in packaging food products in which the packaged product is submerged in heated water or autoclaved or retorted for a period of time sufficient for pasteurising and/or cooking the packaged product, the package being essentially non degradable under such conditions.

The term "pasteurisable" as used herein is intended to refer to packaging material structurally capable of withstanding exposure to pasteurising conditions while containing a food product. Many food products require pasteurisation after they have been hermetically packaged to destroy harmful microbes which grow in the absence of air. Specific pasteurisation conditions tend to vary from country to country; however limiting conditions are probably submersion of the hermetically closed package in water at 95° C. for one hour. Thus, for a bag to be characterised as pasteurisable, structural integrity of the bag must be maintained during pasteurisation, i.e. the bag must have superior high temperature seal strength.

The term "cook-in" as used herein is intended to refer to packaging material structurally capable of withstanding exposure to cook-in time-temperature conditions while containing a food product. Cook-in packaged foods are essentially pre-packaged, pre-cooked foods that go directly to the consumer in that configuration which may be consumed with or without warming. Cook-in time-temperature conditions typically refer to a long slow cook, for example submerging the packaged product in water at 75–85° C. for four to six hours. Such cook-in time-temperature requirements are representative of institutional cooking requirements. Under such conditions, a packaging material properly characterised as cook-in will maintain seal integrity.

Preferably in both cases the packaging film is a solid-state oriented film, either mono-axially or bi-axially oriented, as solid-state orientation improves the mechanical properties of the end structure.

While said mono- or bi-axially oriented films can then be heat-set, preferably, for use in cook-in applications, these oriented films are not thermofixed and shrink under these cook-in conditions so as to form a tightly fitting package. Heat-shrinkable solid-state oriented films are therefore preferred.

Also, preferably the packaging film is a multilayer film comprising a gas-barrier layer.

Thermoplastic, heat-shrinkable, solid-state oriented films bearing a sealing layer of polyethylene or of an ethylene-α-olefin copolymer, either alone or blended with one or more other resins compatible therewith, are known in the patent literature.

For instance Japanese kokai No. 58-82752 describes a gas-barrier heat-shrinkable film comprising a sealing layer of a copolymer of ethylene and an α-olefin optionally blended with up to less than 80% of ethylene-vinyl acetate.

Japanese kokai No. 58-102762 teaches a heat-shrinkable multi-layer barrier film comprising at least one layer of a blend of three different specific resin and a surface layer of linear low density polyethylene (LLDPE).

U.S. Pat No. 4,424,243 describes a heat-shrinkable barrier film with outer layers of ethylene-α-olefin copolymers and an intermediate ethylene-vinyl acetate copolymer layer interposed between the core barrier layer and at least one outer layer.

U.S. Pat. No. 4,456,646 teaches a heat-shrinkable film comprising a core barrier layer and both outer layers consisting of a blend of an ethylene-α-olefin copolymer with 30 to 80% of ethylene-vinyl acetate copolymer.

These films are generally said to be oil and heat resistant. The tests used to evaluate said properties however provide for submerging a package in water with oil floating on the surface thereof at a temperature of 80–95° C. for up to 10 minutes. These conditions therefore are far from those that simulate the heat-treatment used in cook-in applications or for pasteurisation.

In all the above patents the multilayer films are obtained by either coextrusion or extrusion coating of the resins of the different layers to result in a primary thick tube (primary tape) that is quickly cooled to stop or quench the crystallisation of the polymers. The resulting quenched thick tube is thereafter reheated to the so-called orientation temperature and then biaxially stretched at this temperature by a tubular solid-state orientation process using a trapped bubble. In said solid-state orientation step the primary tape is stretched in the transverse direction (TD) by inflation with air pressure to give a bubble, and in the longitudinal or machine direction (MD) by the differential speed between the two sets of nip rolls that contain the bubble. The term "solid-state orientation" is used herein to describe the orientation process carried out at a temperature higher than the highest Tg of the resins making up the structure and lower than the highest melting point of at least one polymer, i.e. at a temperature where the resins, or at least some of the resins, are not in the molten state. "Solid-state orientation" is contrasted to "melt-state orientation", i.e. a process, such as the hot blown one, where stretching takes place upon emergence of the molten resins from the die. For the sake of simplicity, in the following "orientation" and "oriented" have been used to mean "solid-state orientation" and "solid-state oriented" respectively.

While mono-layer polyethylene films cannot be oriented by a tubular orientation process unless they are irradiated before orientation, with multi-layer films, depending on the other layers of the structure and on the specific polymer used, irradiation may be not strictly necessary. It is however widely known in the art that with multi-layer films having a sealing layer comprising a polyethylene or an ethylene-α-olefin copolymer, the primary tape comprising said layer is preferably submitted to an irradiation step before orientation to improve bubble stability.

Generally therefore, in the industrial manufacture of heat-shrinkable multi-layer films having a sealing innermost layer comprising a polyethylene or an ethylene-α-olefin copolymer by a tubular process, either all the layers are coextruded, the tape is quenched, irradiated, reheated and oriented, or some of the layers, including the innermost layer that will become the sealing layer of the end packaging material, are extruded, the tape thus obtained is quenched, irradiated and coated by extrusion of the remaining layers thereon, quenched again, reheated and oriented.

Besides increasing bubble stability, irradiation is also known to improve the physical properties (e.g. strength) of the irradiated resins. In some cases therefore, for instance when a non oriented film is desired or when it would be possible to orient the tape even without irradiation, irradiation may be carried out in order to improve the physical properties of the end packaging film.

Irradiation of the sealing layer is however known to decrease heat-sealability of the film, particularly with polyethylene or ethylene-α-olefin copolymers that are easily cross-linkable polymers.

When the film has to be used in the manufacture of pasteurisable containers or containers for cook-in applications that are highly demanding as to the seal strength, this represents a real problem.

It has now been discovered that it is possible to improve the sealability of mono- or multi-layer films having an irradiated sealing layer comprising a polyethylene and/or an ethylene-α-olefin copolymer to such an extent that cook-in pasteurizable bags can be obtained therefrom by using for the sealing layer a polyethylene and/or an ethylene-α-olefin copolymer with a density $\geq 0.915$ g/cm$^3$ and submitting said sealing layer to a corona discharge treatment.

It has been found in fact that by submitting the irradiated sealing layer of a film, comprising a polyethylene and/or an ethylene-α-olefin copolymer with a density $\geq 0.915$ g/cm$^3$, to a corona discharge treatment, the integrity of a sealed package made therefrom, unlike that of a sealed package made from the same film not corona treated, is maintained under pasteurising or cook-in conditions.

This finding is surprising as it is widely known (see for instance J. M. Farley and P. Meka, J. Appl. Polym. Sc., 51, 121–131 (1994)) that the heat-sealability of non-irradiated films with a polyethylene or an ethylene-α-olefin copolymer as the sealing layer is impaired and certainly not improved by a corona discharge treatment (CDT).

This effect is particularly remarkable with ethylene-α-olefin copolymers with a density >0.915 g/cm$^3$, and even more remarkable with ethylene-α-olefin copolymers with a density >0.917 g/cm$^3$.

A first object of the present invention is therefore a thermoplastic, mono- or multi-layer film having an irradiated sealing layer comprising a polyethylene and/or an ethylene-α-olefin copolymer copolymer with a density $\geq 0.915$ g/cm$^3$, wherein said sealing layer has been corona treated.

A second object of the present invention is a heat-treatable container obtained by sealing, and in particular by impulse sealing, such a film to itself.

A third object is the use of such a container in cook-in applications or for pasteurisation.

A fourth object is a method of improving the seal strength of impulse seals of a mono- or multi-layer film having an irradiated sealing layer comprising a polyethylene and/or an ethylene-α-olefin copolymer with a density $\geq 0.915$ g/cm$^3$, said method comprising submitting said sealing layer to a corona discharge treatment before sealing it.

DEFINITIONS

As used herein, the term "film" includes any flexible plastic web, regardless of whether it is film or sheet. Preferably, films of use in the present invention have a thickness of 250 μm or less, more preferably of 150 μm or less, and even more preferably of 120 μm or less.

As used herein, the term "heat-shrinkable" refers to a film which shrinks by at least 10%, preferably at least 15% and even more preferably at least 20%, of its original dimensions, in at least one direction, when heated to 90° C. for 5 seconds, in accordance with ASTM method D2732.

As used herein, the term "irradiated" refers to a film that has been irradiated to a dosage level of up to about 180 KGy, typically to a dosage level of from about 50 KGy to about 160 KGy, preferably to a dosage level of from about 60 to about 150 KGy and even more preferably to a dosage level of about 70 to about 140 KGy, such as by passing it through an electron beam irradiation unit.

As used herein, the phrases "inner layer", "internal layer", or "intermediate layer" refer to any film layer having both of its principal surfaces directly adhered to another layer of the film.

As used herein, the term "core", and the phrase "core layer" refer to any internal film layer which has a primary function other than serving as an adhesive or compatibilizer for adhering two layers to one another.

As used herein, the term "barrier", and the phrase "barrier layer", as applied to films and/or film layers, is used with reference to the ability of a film or film layer to serve as a barrier to gasses.

As used herein, the phrase "outer layer" or "exterior layer" refers to any film layer having less than two of its principal surfaces directly adhered to another layer of the film. In multi-layer films, there are two outer layers, each of which has a principal surface adhered to only one other layer of the multilayer film.

As used herein, the phrases "seal layer", "sealing layer", "heat seal layer", and "sealant layer", refer to the exterior film layer involved in the sealing of the film to itself.

As used herein, the term "seal" refers to any seal of a first region of a film surface to a second region of a film surface, wherein the seal is formed by heating the regions to at least their respective seal initiation temperatures. The heating can be performed by any one or more of a wide variety of manners, such as by impulse, or using a heated bar, hot air, infrared radiation, etc.

As used herein, the term "outer abuse layer" refers to the outer layer which is not the sealing layer.

As used herein, the phrase "directly adhered", as applied to film layers, is defined as adhesion of the subject film layer to the object film layer, without a tie layer, adhesive, or other layer therebetween. In contrast, as used herein, the word "between", as applied to a film layer expressed as being between two other specified layers, includes both direct adherence of the subject layer between to the two other layers it is between, as well as a lack of direct adherence to either or both of the two other layers the subject layer is between, i.e., one or more additional layers can be imposed between the subject layer and one or both the layers the subject layer is between.

As used herein, the term "polymer" refers to the product of a polymerization reaction, and is inclusive of homopolymers, copolymers, terpolymers, etc.

As used herein, the term "polyolefin" means a thermoplastic homo-, co- or ter-polymer derived from simple olefins, e.g. ethylene, propylene and higher unsaturated aliphatic monomer units, or the halogenated derivatives thereof, as well as the co- or ter-polymers of said simple olefins with co-monomers that are not themselves olefins, e.g. vinyl acetate, acrylic or methacrylic acids, salts, or esters, provided however that the olefin comonomer is present in a major amount. More specifically, included in the term polyolefin are homopolymers of olefins, copolymers of olefins, copolymers of an olefin and a non-olefinic comonomer copolymerizable with the olefin, such as vinyl monomers, and the like. Heterogeneous and homogeneous polymers are included. Specific examples include polyethylene homopolymers, poly-butene, propylene-α-olefin copolymers, ethylene-α-olefin copolymers, butene-α-olefin copolymers, ethylene-vinyl acetate copolymers, ethylene-ethyl acrylate copolymers, ethylene-butyl acrylate copolymers, ethylene-methyl acrylate copolymers, ethylene-acrylic acid copolymers, ethylene-methacrylic acid copolymers, ionomers, chlorinated polyethylene, etc.

As used herein, the phrase "heterogeneous polymer" refers to polymerization reaction products of relatively wide variation in molecular weight and relatively wide variation in composition distribution. Such polymers typically contain a relatively wide variety of chain lengths and comonomer percentages.

As used herein, the phrase "homogeneous polymer" refers to polymerization reaction products of relatively narrow molecular weight distribution and relatively narrow composition distribution. Homogeneous polymers exhibit a relatively even sequencing of comonomers within a chain, the mirroring of sequence distribution in all chains, and the similarity of length of all chains.

As used herein, the term "polyethylene" refers to homopolymers derived from the polymerization of ethylene units. Said term is inclusive of LDPE (low density polyethylene with a density of up to 0.935 g/cm$^3$) and of HDPE (high density polyethylene characterised by a density higher than 0.935 g/cm$^3$).

As used herein, the phrase "ethylene-α-olefin copolymer" refers to co- or ter-polymers of ethylene with one or more ($C_4$–$C_8$)-α-olefins, such as butene-1, hexene-1, 4-methyl-pentene-1, and octene-1. Said term includes such heterogeneous materials as linear low density polyethylene (LLDPE with a density comprised between about 0.915 and 0.925 g/cm$^3$), linear medium density polyethylene (LMDPE with a density higher than 0.925 g/cm$^3$), and very low density polyethylene (VLDPE with a density of less than 0.915 g/cm$^3$); and homogeneous polymers such as Ziegler-Natta-catalyzed homogenous polymers, as well as metallocene-catalyzed homogenous polymers.

As used herein the term "modified polyolefins" include modified polymers prepared by copolymerizing the homopolymer of the olefin or copolymer thereof with an unsaturated carboxylic acid, e.g., maleic acid, fumaric acid or the like, or a derivative thereof such as the anhydride, ester or metal salt or the like, or by incorporating into the olefin homopolymer or copolymer, an unsaturated carboxylic acid, e.g., maleic acid, fumaric acid or the like, or a derivative thereof such as the anhydride, ester or metal salt or the like.

As used herein, the phrase "tie layer" refers to any internal layer having the primary purpose of adhering two layers to one another. Tie layers generally comprise a non-polar or slightly polar polymer having a polar group grafted thereon; preferably, tie layers comprise at least one member selected from the group consisting of polyolefin and modified polyolefin, e.g. ethylene-vinyl acetate copolymer, modified ethylene-vinyl acetate copolymer, heterogeneous and homogeneous ethylene-α-olefin copolymer, and modified heterogeneous and homogeneous ethylene-α-olefin copolymer; more preferably, tie layers comprise at least one member selected from the group consisting of anhydride grafted linear low density polyethylene, anhydride grafted low density polyethylene, homogeneous ethylene-α-olefin copolymer, and anhydride grafted ethylene-vinyl acetate copolymer.

DETAILED DESCRIPTION OF THE INVENTION

The sealing layer of the film according to the present invention comprises a polymer selected from the group consisting of polyethylene and ethylene-α-olefin copolymers with a density ≧0.915 g/cm$^3$.

Preferably said sealing layer will comprise at least one ethylene-α-olefin copolymer with a density ≧0.915 g/cm$^3$. Preferred polymers are those, either heterogeneous or homogeneous, with a density comprised between about 0.915 and about 0.935 g/cm$^3$, and even more preferred those with a density of from about 0.917 to about 0.930 g/cm$^3$.

The melt flow index of said polymers to be used in the construction of the sealing layer in the film according to the present invention generally ranges from between about 0.1 to about 5 g/10' and preferably between from about 0.5 to about 2.5 g/10'. Melt Flow Index (MFI) is measured according to ASTM D1238 Condition E (2.16 kg loading at 190° C.).

In general these polymers may be blended with one or more other polymers compatible therewith, such as polyolefin polymers. These blends will typically comprise 50% or more, preferably 70% or more and even more preferably 80% or more by weight of polyethylene and/or ethylene-α-olefin copolymer with a density ≧0.915 g/cm$^3$.

In a preferred embodiment of the present invention, said sealing layer will essentially consist of polyethylene and/or ethylene-α-olefin copolymer with a density ≧0.915 g/cm$^3$.

In another preferred embodiment said sealing layer will essentially consist of a blend of at least 80% by weight of polyethylene and/or ethylene-α-olefin copolymer with a density ≧0.915 g/cm$^3$ with up to 20% by weight of one or more polymers selected from the group consisting of ethylene-vinyl acetate copolymers, ethylene-alkyl acrylate copolymers, anhydride grafted ethylene-alkyl acrylate copolymers, ethylene-alkyl methacrylate copolymers, anhydride grafted ethylene-alkyl methacrylate copolymers, ethylene-acrylic acid copolymers, ethylene-methacrylic acid copolymers, and ethylene-maleic anhydride-alkyl (meth) acrylate terpolymers.

The sealing layer will typically be at least 4 μm thick, preferably at least 7 μm thick, and even more preferably at least 9 μm thick. Generally the thickness of said sealing layer may range from about 4 to about 25 μm, depending on the overall film thickness and on the number of layers in the structure.

Films according to the present invention are preferably multi-layer films comprising besides the sealing layer as described above at least one core gas-barrier, layer and one outer abuse layer.

The gas of main concern is oxygen and transmission is considered to be sufficiently low, i.e. the gas-barrier material is relatively gas impermeable when the transmission rate is below 100 cm$^3$/day.m$^2$.atm as measured according to the procedures of ASTM D3985 at 23° C. and 100% Relative Humidity. To obtain oxygen barrier layers with a transmission rate below that value, PVDC or EVOH, possibly blended with a polyamide or copolyamide, can advantageously be employed. Preferably however the barrier layer will comprise EVOH as this polymer can be irradiated even at high dosage levels without degradation. With an oxygen barrier layer comprising EVOH an irradiated fully coextruded structure is typically employed what reduces any possible risk of delamination that might be present in case of extrusion coated structures when they are subjected to a drastic heat-treatment.

Once the gas-barrier resin has been selected, its thickness will be set to provide for an oxygen transmission rate below 100 cm$^3$/day.m$^2$.atm. Typically the thickness of the barrier layer ranges from about 2 to about 10 μm, preferably from about 3 to about 8 μm, and more preferably from about 4 to about 7 μm.

As the outer abuse layer, particularly when an ethylene-vinyl alcohol copolymer is used as the barrier layer, a moisture-barrier material, such as an ethylene homo- or co-polymer or a propylene homo- or co-polymer is preferably employed. As an example said outer abuse layer may comprise a polyethylene, an ethylene-α-olefin copolymer, an ethylene-vinyl acetate copolymer, an ionomer, a blend thereof with modified polyolefins, a polypropylene, a propylene-ethylene copolymer, etc.. According to a preferred embodiment of the invention said outer abuse layer will comprise an ethylene-vinyl acetate copolymer. In a most preferred embodiment said outer abuse layer will comprise an ethylene-vinyl acetate copolymer with a vinyl acetate content of from about 4 to about 14% by weight and more preferably of from about 5 to about 9% by weight, preferably with a Melt Flow Index lower than 1 g/10', optionally blended with a heterogeneous or homogeneous ethylene-α-olefin copolymer with a density of from about 0.900 to about 0.935 g/cc.

The thickness of said outer layer is not critical and it is generally comprised between about 2 and about 35 µm, preferably between about 6 and about 30 µm and more preferably between about 10 and about 25 µm.

Additional layers, such as for instance tie layers to improve interlayer adhesion, or bulky structural layers to provide the overall structure with the desired mechanical properties, or shrink layers to improve the shrink properties of the heat-shrinkable films, can be present as known in the art.

If the structure contains tie layers their thickness is generally comprised between about 0.5 and about 7 µm, and preferably between about 2 and about 5 µm.

Non limitative examples of suitable, preferred, structures are for instance 5-, 6- or 7-ply structures of the following type:

Seal/Tie/Gas-barrier/Tie/Outer abuse

Seal/Inner structural/Tie/Gas-barrier/Tie/Outer abuse

Seal/Tie/Inner structural/Tie/Gas-barrier/Tie/Outer abuse wherein the Inner structural layer, that may be equal or different from the Outer abuse layer, may comprise one or more polymers selected from the groups of polyolefins, polyamides and copolyamides.

Preferably the film according to the present invention is a heat-shrinkable film.

Irradiation may be accomplished by the use of high energy electrons. Preferably electron radiation up to about 200 KGy dosage level is employed. The irradiation source can be any electron beam generator operating in a range of about 150 kV to about 6 MV with a power output capable of supplying the desired dosage. Many apparatuses for irradiating films are known to those skilled in the art. Irradiation is usually carried out at a dosage of from about 50 to about 160 KGy, preferably at a dosage of from about 60 to about 150 KGy, and more preferably at a dosage level of from about 70 to about 140 KGy. Irradiation can be carried out conveniently at room temperature, although higher and lower temperatures, for example 0° C. to 60° C., may be employed. In case of heat-shrinkable films, as indicated above irradiation is preferably carried out on the primary tape before orientation as irradiation has the main purpose of improving bubble stability. If this is not necessary however, irradiation, to improve the structure strength, can be carried out also after orientation.

The films according to the present invention can be prepared by conventional method of manufacturing, by extrusion, coextrusion or extrusion coating through a round or flat die, followed by irradiation. Preferably however, as indicated above, the film is manufactured by coextrusion. When, according to a highly preferred embodiment of the invention, a heat-shrinkable film is desired, the primary tape thus obtained is quenched and oriented, either by tenterframe, in case of extrusion through a flat die or by a tubular orientation process in case of extrusion through a round die. Irradiation is preferably carried out before orientation, but in some cases it can alternatively be carried out after orientation.

The corona treatment of the sealing layer is carried out just before conversion of the film sheet or tubing into containers by impulse-sealing the film to itself. It is performed in the conventional manner. When the film is in the form of a seamless tubing, corona treatment of the innermost layer is carried out by inflating the tubing with a gas, such as air or other gases such as nitrogen, carbon dioxide, oxygen, ozone, etc., and the mixtures thereof as known in the art, in an amount sufficient to prevent the contact of the internal surfaces of the tube while keeping the tubing in a substantially flat state, and the corona discharge treatment of the innermost sealing layer is conducted from the outside by positioning at least one discharge electrode and at least one counter electrode closed to the upper and lower outer surfaces of the inflated tubing, suitably adjusting the distance between the electrodes to contact the outer surfaces of the inflated tubing, and discharging electricity from the discharge electrode to the counter electrode through the inflated tubing.

The optimum corona treatment level will depend on the kind, thickness and feed rate of the film to be corona treated. It has been found that the improvement in sealability is obtained when the conditions for corona discharge treatment are adjusted so that the treatment provides the surface of the sealing layer with a wet tension strength of at least 30 dyne/cm, preferably at least about 35 dyne/cm, more preferably at least 40 dyne/cm. The corona treatment energy level generally employed with the film according to the present invention is typically from about 150 to about 500 mA. However, lower or higher energy levels might also be suitably employed to provide the film surface with the desired wet tension strength.

The obtained tubing is then converted into bags by cutting lengths of the tubular film and sealing such lengths transversely to obtain end-seal or bottom seal bags. Alternatively the tubing is cut and sealed in such a way to obtain side seal bags.

The bags obtained from the film according to the present invention show outstanding properties in terms of cold and hot seal strength. Thus when such bags are used in food packaging, the food item is inserted in the bag, the package is vacuumized and closed by heat-sealing or by clipping, and the package can then be subjected to various heat treatments such as cooking at a temperature up to about 85° C. for several hours or pasteurisation treatment at 95° C. for 1 hour. The bags stand these treatments without revealing damages or weakening of the seal.

The examples which follow, only purport to illustrate the invention and not to restrict its field of application.

The following abbreviations have been used in the following Examples to identify the materials:

PE1 Heterogeneous ethylene-α-olefin copolymer with d=0.920 g/cm$^3$ and MI=0.8–1.2 g/10' (DOWLEX™ 2044E by Dow Chemical Co.)

PE2 Homogeneous ethylene-α-olefin copolymer with d=0.923 g/cm$^3$ and MI=0.85 g/10' (AFFINITY™ XU59900.00 by Dow Chemical Co)

PE3 Heterogeneous ethylene-α-olefin copolymer with d=0.920 g/cm$^3$ and MI=4.4 g/10' (STAMYLEX™ 1046F by DSM)

PE4 Homogenous ethylene-α-olefin copolymer with d=0.918 g/cm$^3$ and MI=3 g/10' (AFFINITY™ DSL 1515.00 by Dow Chemical Co.)

PEC Heterogeneous ethylene-α-olefin copolymer with d=0.911 g/cm$^3$ and MI=5.7–7.5 g/10' (STAMYLEX™ 08-076 F by DSM)

LG1 anhydride modified EVA-based adhesive with MI=0.9–1.3 g/10'—(BYNEL™ 3062 by DuPont).

EVA1 EVA (6% VA) with MI=2.5 g/10'—(ESCORENE™ FL 00206 by Exxon).

EVA2 EVA (13% VA) with MI=2.5 g/10'—(ESCORENE™ FL 00212 by Exxon)

EVA3 EVA (13% VA) with MI=0.4 g/10'—(EVATANE™ 1003 VN 4 by Elf Atochem)

EBA Ethylene-butyl acrylate copolymer (7% BA) with MI=1.1 g/10' (NCPE-6472 by Borealis)

EMAA Ethylene-methacrylic acid copolymer (12% MAA) with MI=1.4–2.0 g/10' (NUCREL™ 1202 by DuPont)

BL1 Blend of PE1 (80% by weight) and EVA3 (20% by weight)

BL2 Blend of PE1 (80% by weight) and EMAA (20% by weight)

BL3 Blend of PE1 (80% by weight) and EBA (20% by weight)

EVOH Ethylene-vinyl alcohol copolymer with 44% by mole of ethylene content and MI=4.9–6.1 g/10'—(EVAL™ EP-E105A by Marubeni)

EXAMPLES 1 to 9

6layer films of general structure A/B/C/D/C/E, wherein the resins employed for the different layers are as indicated in following Table I, are prepared by coextrusion from a round die, followed by a quick quenching with cold water, irradiation to the dosage level indicated in Table I, heating with hot water (96° C.) and biaxial orientation at this temperature with stretching ratios of 2.8×3.4 (MD×TD). The thickness of the end film was 60 μm, and the ratio between the layers was 3/3/1/1/1/5. The sealing layers of the obtained tubing were then corona treated at 240 mA.

TABLE I

| Ex no. | A | B | C | D | E | KGy |
|---|---|---|---|---|---|---|
| 1 | PE1 | EVA3 | LG1 | EVOH | EVA1 | 75 |
| 2 | PE1 | EVA3 | LG1 | EVOH | EVA1 | 100 |
| 3 | BL1 | EVA1 | LG1 | EVOH | EVA1 | 75 |
| 4 | BL2 | EVA3 | LG1 | EVOH | EVA1 | 75 |
| 5 | BL3 | EVA3 | LG1 | EVOH | EVA1 | 75 |
| 6 | PE1 | EVA2 | LG1 | EVOH | EVA1 | 75 |
| 7 | PE2 | EVA3 | LG1 | EVOH | EVA1 | 75 |
| 8 | PE3 | EVA1 | LG1 | EVOH | EVA1 | 75 |
| 9 | PE4 | EVA1 | LG1 | EVOH | EVA1 | 75 |

COMPARATIVE EXAMPLES 1 TO 9

The films of Comparative Examples (CE) 1 to 9 were obtained by following exactly the same procedure as in Examples 1 to 9 but avoiding the corona treatment.

The tubular films of Examples 1 to 9 and of Comparative Examples 1 to 9 have been converted into 300×500 mm end seal bags by a continuous process. The bag-making machine was run at 120 bags/minute and the impulse of the sealing wire was set at 14.5 A. Cold and hot seal strength of the obtained bags have been evaluated by the methods indicated hereinbelow in line and in some cases also after 3-week ageing.

The cold seal strength has been evaluated by the test of the Parallel Plates (PP) that provides for a bag to be confined between two plates a specified distance apart and be inflated until the seal fails. The pressure level inside the bag at the point of failure is a measure of the quality of the seal. The results of this test are reported in inches of water pressure (IOWP).

The hot seal strength has been evaluated by the test of the Variable Pressure Hot Burst (VPHB) that provides that a clean sealed bag be inflated to a specified dwell pressure and the seal area be submerged in hot water at 85° C. After ten seconds the pressure inside the bag is increased at a specified rate ranging from 1 to 7 inches of water/second (2.49 to 17.43 mBar/s). The pressure at burst is a measure of seal quality. The results are reported in mBar.

The results obtained in these tests are summarised in following Table II

TABLE II

| | PP (IOWP) in-line | VPHB (mBar) in-line | PP (IOWP) aged | VPHB (mBar) aged |
|---|---|---|---|---|
| Ex. 1 | 177.6 | 121.1 | 130.4 | 114.3 |
| CE 1 | 66.4 | 41.4 | n.d. | n.d. |
| Ex. 2 | 123.4 | 111.7 | 124.5 | 111.4 |
| CE 2 | 42.3 | 28.8 | n.d. | n.d |
| Ex. 3 | 138.8 | 120.9 | 151.5 | 112.8 |
| CE 3 | 45.4 | 30.6 | n.d. | n.d. |
| Ex. 4 | 130.8 | 105.9 | 108.6 | 96.3 |
| CE 4 | 49.1 | 41.3 | 40.4 | 49.1 |
| Ex. 5 | 157.0 | 119.8 | 164.3 | 112.4 |
| CE 5 | 64.9 | 49.6 | 66.1 | 49.1 |
| Ex. 6 | 133.0 | 114.8 | 142.6 | 111.1 |
| CE 6 | 47.1 | 40.2 | n.d. | n.d. |
| Ex. 7 | 165.7 | 118.1 | n.d. | n.d. |
| CE 7 | 85.7 | 75.2 | n.d | n.d. |
| Ex. 8 | 164.2 | 110.5 | n.d. | n.d. |
| CE 8 | 149.5 | 102.2 | n.d. | n.d. |
| Ex. 9 | 176.8 | 111.5 | n.d. | n.d. |
| CE 9 | 152.3 | 103.4 | n.d. | n.d. | n.d. = not determined

COMPARATIVE EXAMPLE 10

The speed of the bag-making machine has been decreased from 120 bags/minute to 100, 90, and 80 bags/minute and the seal power has been increased from 14.5 to 16.5 A and the results of the VPHB for the film of Comparative Example 1 has always been below 50 mBar.

COMPARATIVE EXAMPLES 11 and 12

A 6-layer film differing from that of Example 1 for the sealing layer comprising PEC instead of PE1 was obtained according to the procedure described under Examples 1 to 9, irradiating at 75 KGy (Comparative Example 11). By simply avoiding the corona treatment Comparative Example 12 was obtained. The two films have been converted into end seal bags and the cold seal strength and the hot seal strength have been evaluated as described under Comparative Examples 1 to 9. The results obtained are reported in following Table III

TABLE III

| | PP (IOWP) in-line | VPHB (mBar) in-line |
|---|---|---|
| CE 11 | 176.6 | 97.3 |
| CE 12 | 181.9 | 100.2 |

Thus no improvement in the seal strength of the irradiated structure was observed when an ethylene-α-olefin with a density <0.915 g/cm$^3$ was employed.

EXAMPLE 13

10 bags (300×500 mm) were made with the film of Example 1 and 10 bags of the same size were made with the film of Comparative Example 1. They were all filled with 2.1 liter of water mixed with 20 cc of olive oil, sealed and tested in a simulated cook-in test where the bags were submerged in hot water at the temperature and for the time indicated in the following Table IV.

TABLE IV

| Temperatures/ time | Total cooking time (h) | Number of rejects Ex. 1 | CE1 |
|---|---|---|---|
| 1) After 1 h at 70 ° C. | 1 | 0 | 0 |
| 2) 1 + 1 h at 75° C. | 2 | 0 | 0 |
| 3) 2 + 1 h at 80° C. | 3 | 0 | 2 |
| 4) 3 + 1 h at 85° C. | 4 | 0 | 8 |
| 5) 4 + 1 h at 90° C. | 5 | 0 | end |
| 6) 5 + 1 h at 95° C. | 6 | 0 | |
| 7) 6 + 1 h at 100° C. | 7 | 1 | |

EXAMPLE 14

The film of Example 14 is obtained by following the procedure of Example 1 but corona treating at 450 mA instead of 240 mA. The seal quality of the obtained structure, evaluated by the Parallel Plates and the Variable Pressure Hot Burst tests, is slightly better than that of the structure of Example 1.

What is claimed is:

1. A thermoplastic, mono- or multi-layer film comprising a sealing layer irradiated at a dosage of from about 50 kGy to about 180 kGy, wherein:

the sealing layer comprises 80% or more by weight of the sealing layer of one or more polymers selected from polyethylene and ethylene-α-olefin copolymer with a density ≧0.915 g/cm$^3$, wherein the polyethylene and ethylene-α-olefin copolymer each have a density of less than 0.935 g/cm$^3$; and the sealing layer is corana treated.

2. A film according to claim 1 which is heat-shrinkable.

3. A film according to claim 1 which is a multilayer film comprising in addition to the sealing layer a gas-barrier layer and an outer abuse layer.

4. A film according to claim 3 wherein the gas-barrier layer comprises at least one ethylene-vinyl alcohol copolymer.

5. A film according to claim 1 wherein the corona discharge energy level is such to provide the surface of the sealing layer with a wet tension strength of at least 30 dyne/cm (0.03 N/m).

6. A film according to claim 5 wherein the corona treatment energy level is from 150 to 500 mA.

7. A film according to claim I wherein the irradiation is carried out at a dosage of from about 60 to about 160 kGy.

8. A film according to claim 1 wherein the sealing layer comprises 80% or more by weight of the sealing layer of ethylene-α-olefin copolymer with a density ≧0.915 g/cm$^3$.

9. A film according to claim 8 wherein the ethylene-α-olefin copolymer has a density between about 0.917 and about 0.930 g/cm$^3$.

10. A film according to claim 8 wherein the ethylene-α-olefin copolymer has a melt flow index of from about 0.5 to about 2.5 g/10 min, measured according to ASTM D1238 Condition E.

11. A heat-sealed container comprising the a film of claim 9.

12. A film according to claim 1 wherein the sealing layer comprises at least 80% (by weight of the sealing layer) of polyethylene.

13. A heat-sealed container comprising the film of claim 12.

14. A heat-processable package comprising a container comprising the film of claim 1.

15. A method of packaging a heat-processable item comprising inserting said item into a container according to claim 14, closing it by clipping or sealing, and subjecting the package to a heat treatment.

16. A thermoplastic film having an irradiated and corona-treated sealing layer comprising at least 70% (by weight of the sealing layer) ethylene-α-olefin copolymer having a density 0.917 g/cm$^3$ and less than about 0.930 g/cm$^3$.

17. The film of claim 16 wherein the sealing layer comprises at least 80%, by weight of the sealing layer, of ethylene-α-olefin copolymer having a density ≧0.917 g/cm$^3$.

18. The film of claim 17 wherein the irradiation is carried out at a dosage of from about 50 KGy up to about 180 KGy.

19. A method of improving heat-sealability of a mono- or multi-layer film comprising a sealing layer irradiated at a dosage of from about 50 kGy to about 180 kGy, wherein the sealing layer comprises 80% or more by weight of the sealing layer of one or more polymers selected from a polyethylene and ethylene-α-olefin copolymer with a density ≧0.915 g/cm$^3$, said method comprising submitting said sealing layer to a corona discharge treatment before sealing it.

* * * * *

UNITED STATES PATENT AND TRADEMARK OFFICE
CERTIFICATE OF CORRECTION

PATENT NO. : 6,558,760 B1
DATED : May 6, 2003
INVENTOR(S) : Paleari et al.

It is certified that error appears in the above-identified patent and that said Letters Patent is hereby corrected as shown below:

Column 11,
Line 40, "corana" should be -- corona --.

Column 12,
Line 1, "I" should be -- 1 --.
Line 2, insert immediately before "150" the word -- about --.
Line 2, insert immediately before "500" the word -- about --.
Line 33, insert immediately before "0.917" the symbol -- $\geq$ --.
Line 45, after the word "from", delete the word "a".

Signed and Sealed this

Twenty-sixth Day of August, 2003

JAMES E. ROGAN
*Director of the United States Patent and Trademark Office*